United States Patent
Hillman

(10) Patent No.: US 11,605,171 B1
(45) Date of Patent: Mar. 14, 2023

(54) METHOD AND APPARATUS FOR PROCESSING REFERENCE INPUTS FOR VIDEO COMPOSITING WITH REPLACEMENT

(71) Applicant: Unity Technologies SF, San Francisco, CA (US)

(72) Inventor: Peter Hillman, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 154 days.

(21) Appl. No.: 17/193,204

(22) Filed: Mar. 5, 2021

Related U.S. Application Data

(60) Provisional application No. 63/091,187, filed on Oct. 13, 2020.

(51) Int. Cl.
*G06T 7/00* (2017.01)
*G06T 7/246* (2017.01)
*G06T 3/40* (2006.01)
*G06T 7/90* (2017.01)
*G06T 7/33* (2017.01)

(52) U.S. Cl.
CPC ............ *G06T 7/248* (2017.01); *G06T 3/4007* (2013.01); *G06T 7/337* (2017.01); *G06T 7/90* (2017.01)

(58) Field of Classification Search
CPC ........ H04N 9/77; H04N 9/67; H04N 5/23229; G06T 5/50; G06T 7/35; G06T 7/337; G06T 7/0004; G06T 7/254; G06T 7/33; G01K 11/26; G06K 9/3216; G06K 9/0063
USPC .......................................... 382/100; 348/244
See application file for complete search history.

(56) References Cited

U.S. PATENT DOCUMENTS

| | | | | |
|---|---|---|---|---|
| 10,742,877 B1 * | 8/2020 | Ning | ................... | H04N 5/23229 |
| 2019/0222813 A1 * | 7/2019 | Kane | ........................ | H04N 9/77 |

* cited by examiner

*Primary Examiner* — Phuoc H Doan
(74) *Attorney, Agent, or Firm* — Haynes and Boone LLP

(57) ABSTRACT

A compositor generates a representation of a gradient image corresponding to a replaceable background object in a scene. The representation can be generated from user set of reference points in the scene.

24 Claims, 12 Drawing Sheets

METHOD AND APPARATUS FOR PROCESSING REFERENCE INPUTS FOR VIDEO COMPOSITING WITH REPLACEMENT

CROSS-REFERENCES TO PRIORITY AND RELATED APPLICATIONS

This application claims the benefit of, and priority from, U.S. Provisional Patent Application No. 63/091,187 filed Oct. 13, 2020, entitled "Method and Apparatus for Processing Reference Inputs for Video Compositing with Replacement."

The entire disclosure of the application recited above is hereby incorporated by reference, as if set forth in full in this document, for all purposes.

FIELD

The present disclosure generally relates to computer graphics processing and more particularly to determining bounds and/or makeup of image portions to be replaced.

BACKGROUND

In computer graphics applications, it is often desirable to record video of a live action scene and replace portions of the resulting video images. Part of that process is delineating which portions remain and which portions are removed. In one approach, a live action scene is filmed with objects and characters in front of a bright green background (often called a "green screen", but it could be other colors) and computer software is used to determine which pixels of which frame are to be wholly or partially removed based on those pixels having a color corresponding to the screen background. With the green screen approach, there might be a designated color and if a pixel is that designated color, it is replaced. This can be useful for filming a live action scene between actors safely in a studio in front of a green screen, then replacing pixels deemed to be replaceable pixels with pixels of a shot of a sheer cliff in howling winds, to create a composited video that appears to show the actors acting on the edge of the sheer cliff.

Often, to avoid artifacts, much care is put into selecting the background material, uniformly lighting it, positioning it in the live action scene, etc. so that the computer software correctly adjusts the captured video to remove the green screen. This can be a tedious process and improvements are possible to a compositing process and to user interfaces used to implement the compositing process.

SUMMARY

In an embodiment, a computer-implemented method for generating multigradient image components in an image processing system comprises, under control of one or more computer systems configured with executable instructions, obtaining a first user input comprising at least a set of reference pixels, each having a pixel location in an image array, obtaining a second user input comprising reference pixel color values associated with each reference pixel of the set of reference pixels, computing a color gradient array from the reference pixel color values and reference pixel locations, wherein the color gradient array represents gradient color values for pixels over the image array based on reference pixel color values and the reference pixel locations wherein the gradient color values vary over the color gradient array and align with the reference pixel color values at their respective reference pixel locations, and processing a first image using the color gradient array.

The computer-implemented method might further comprise obtaining at least one image, including the first image, of live action using an image capture device or system, generating a displayable representation of the first image, wherein the set of reference pixels comprises first image pixels of the first image, and determining the reference color values and the reference pixel locations for each reference pixel of the set of reference pixels, wherein processing the image comprises processing a second image using the color gradient array.

The computer-implemented method might even further comprise presenting the displayable representation to a user on an image display device and accepting inputs from the user selecting the set of reference pixels on the image display device.

The set of reference pixels might be pixels selected to correspond with pixels representing a chroma keying background of a scene. Computing the color gradient array might comprise interpolating color values at interpolation locations other than the reference pixel locations. Interpolating color values might comprise computing a radial basis function from the reference color values and the reference pixel locations and setting gradient color values for interpolation pixels other than the reference pixels of the set of reference pixels according to the radial basis function. The radial basis function might be a thin-plate spline radial basis function.

Computing the color gradient array might comprise determining a first proportion for an interpolation pixel at an interpolation location other than one of the reference pixel locations, wherein the first proportion represents a proportion of a foreground contribution to a color of the interpolation pixel and a background contribution to the color of the interpolation pixel, and representing an interpolating color value at the interpolation location based, in part, on the first proportion. The first proportion for an interpolation pixel and first proportions for other interpolation pixels might be represented in an alpha channel.

The computer-implemented method might further comprise processing the first image using the color gradient array to determine background pixels, foreground pixels, and mixed foreground-background pixels, subtracting a first set of color gradient array pixel color values from the background pixels, partially subtracting a second set of color gradient array pixel color values from the mixed foreground-background pixels, and merging a resulting image with a replacement background image. Determining a first proportion for an interpolation pixel at an interpolation location other than one of the reference pixel locations might comprise representing the first proportion as a proportion of a foreground contribution to a color of the interpolation pixel and a background contribution to the color of the interpolation pixel, wherein partially subtracting comprises subtracting based, in part, on the first proportion.

The computer-implemented method might comprise merging the color gradient array with a second image to form a third image, wherein color in the color gradient array contributes to pixel colors in the third image.

The computer-implemented method might comprise obtaining a third image, the third image representing a live action scene, determining a time relationship between the first image and the third image, determining a set of correspondence pixels in the third image that correspond to the reference pixels of the set of reference pixels of the first image, determining a second set of reference color values and a second set of pixel locations for correspondence pixels in the set of the reference pixels, computing a second color gradient array, for the third image, from the second set of reference color values and the second set of pixel locations, wherein the second color gradient array represents gradient color values for pixels over the image array based on the third image, and processing the third image into a fourth image using the second color gradient array.

The set of correspondence pixels in the third image that correspond to the reference pixels of the set of reference pixels of the first image might be determined from matching pixels of the third image with pixels in the first image based on respective pixel color values.

The computer-implemented method might comprise determining movement of scene elements in the third image relative to the first image and selecting the correspondence pixels in the third image based on pixel positions of the reference pixels of the first image and determined movement of the scene elements, to at least approximately align the correspondence pixels with objects in a scene.

Determining the movement of the scene elements in the third image relative to the first image might comprise identifying a first set of tracking markers in the first image, selecting the reference pixels relative to the first set of tracking markers, identifying a second set of tracking markers in the third image, the second set of tracking markers corresponding to the first set of tracking markers, and selecting the correspondence pixels in the third image based on the second set of tracking markers and relative positions of the reference pixels relative to the first set of tracking markers.

In an embodiment, a non-transitory computer-readable storage medium provides for storing instructions, which when executed by at least one processor of a computer system, causes the computer system to carry out one or more of the methods described herein. A computer-readable medium might carry instruction, which when executed by at least one processor of a computer system, causes the computer system to carry out one or more of the methods described herein.

A computer system might comprise one or more processors and a storage medium storing instructions, which when executed by the at least one processor, cause the computer system to implement one or more of the methods described herein. A carrier medium might carry image data that includes a composited image, and/or a gradient image generated according to one or more of the methods described herein.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
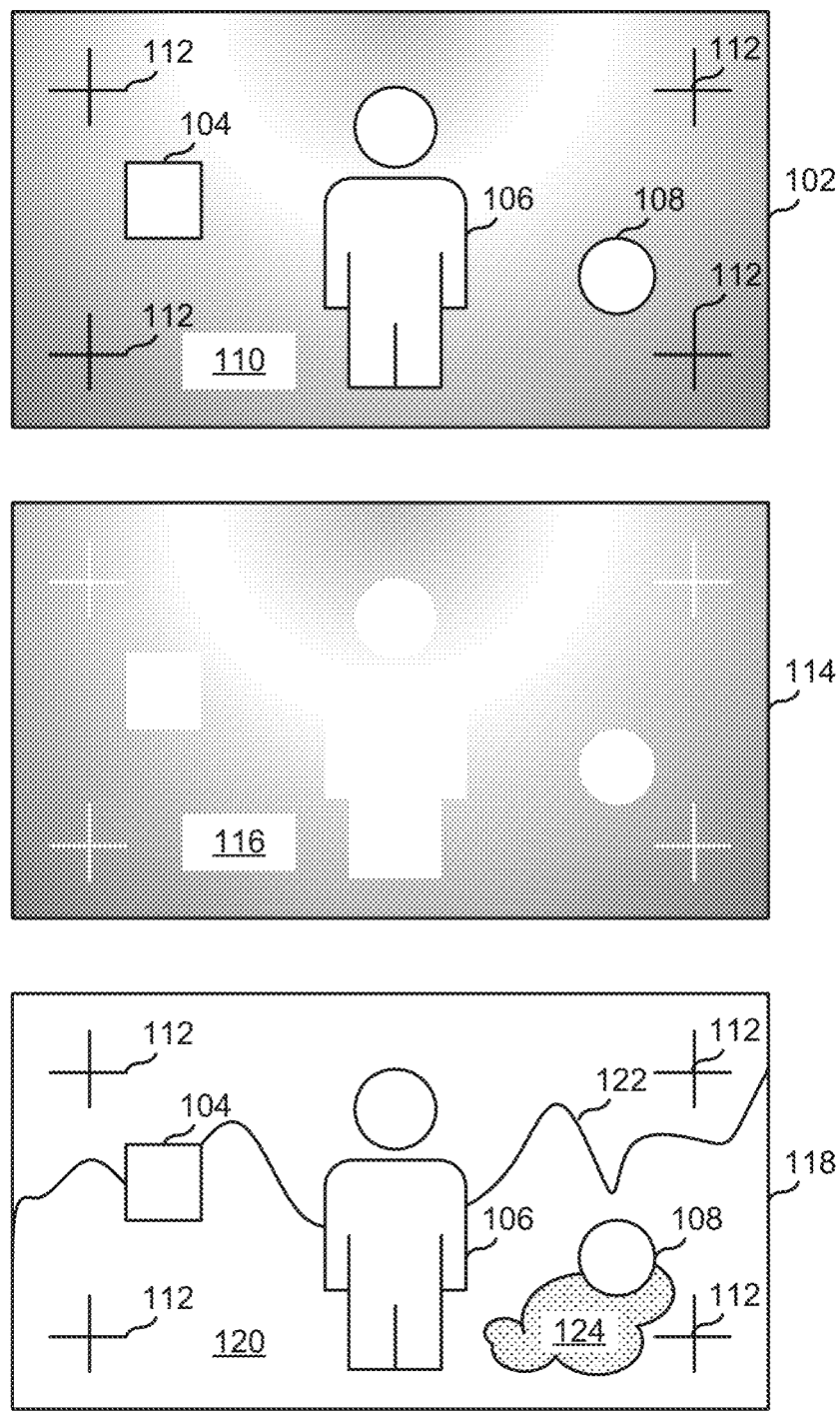
FIG. 1 illustrates a frame of a captured scene of objects, a removed background, and a replaced background.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computer-generated imagery might comprise images or sequences of images or frames having a time component that form a video sequence. An animation processing system might take in video frames captured from live action and alter them to produce a resulting video that is different than what was actually present in the scene. In one aspect, video frames are processed to identify retained pixels (e.g., pixels of a live action scene that are to be kept), replaceable pixels (e.g., pixels of a live action scene that are to replaced, such as pixels of portions of a video frame that show a "green screen" or designated replaceable background object), and replacement pixels (e.g., pixels generated elsewhere that are added to the video frame to replace replaceable pixels). In some instances, subpixel operations might be done, such as where a given pixel is partly a retained object, partly green screen, and thus is "partly" replaced with a replaceable pixel. The retained pixels and replaceable pixels might be in distinct regions of the video frame and clearly delineated, or there might be some ambiguity.

This identification of replaceable pixels with replacement pixels is sometimes done using chroma key compositing using a predetermined color or colors or color range to indicate replacement pixels. The predetermined color, colors or range might be selected to be distinct from the colors of objects that might be foreground objects represented by retained pixels.

Compositing is a computer process wherein replaceable pixels of a frame (or blank or nonexistent portions of the frame) are replaced with replacement pixels. Where the designated replaceable background object is uniformly lit, has uniform color, and is of a color that does not exist in the retained pixels, and the replaceable background object is bounded at only pixel boundaries, compositing is a simple matter if checking each pixel's color and if it is of the uniform designated color, replacing that pixel with a corresponding replacement pixel. Complexities can arise where there are objects that are to be retained but contain some color that is the same as the uniform designated color, where the designated replaceable background object is not uniformly or consistently lit, or where other problems arise.

A compositing system might provide a compositing operator a display of a captured image. The compositing system might have a user interface with which the compositing operator can select a set of reference pixels relative to the captured image, which might allow for an arbitrary number of reference pixels. Each reference pixel might be represented in memory or storage has a location in an image array of the captured image and for each reference pixel, a reference pixel color value is determined from the captured image. From the set of reference pixels, their locations and their reference pixel color value, the compositing system can compute a color gradient array, which would include interpolated color values for pixels other than the reference pixels. The color gradient array can represent gradient color values for pixels over the image array based on reference pixel color values and the reference pixel locations. The gradient color values can vary over the color gradient array and at the reference pixel locations, equal to those pixels' reference pixel color values, at least approximately.

In this manner, a compositing operator can select representative pixels on an image that are pixels showing a greenscreen or other chroma keying reference object (more generally, a background element), and have the compositing system generate a smooth color gradient array that could be deemed to correspond to the color, possibly varying over the captured image, of the background element. Knowing that color gradient array, the compositing system could determine what other pixels are likely depicting the background element and use that information for replacing the background element with pixels from the background element.

Interpolating color values for pixels other than reference pixels might comprise computing a radial basis function from the reference color values and the reference pixel locations and setting gradient color values for interpolation pixels other than the reference pixels of the selection of reference pixels according to the radial basis function. The radial basis function might be a thin-plate spline radial basis function.

The compositing system might compute what proportion of a pixel of the captured image is contributed by the background object and what proportion of that pixel is contributed by a foreground element and thus could compute an alpha channel image usable for various purposes. In some variations, the pixel color value of a reference pixel can be specified by the compositing operator rather than it being set based on the pixel color value from the captured image.

The color gradient array might be computed from one captured image and a set of reference pixels, but used for other frames where the captured image is one frame of a video sequence. For example, the compositing operator might select reference pixels in a first frame and the compositing system could compute where corresponding pixels are in a nearby-in-time frame that correspond to those reference pixels and then compute a color gradient array for that nearby-in-time frame. The frame-to-frame correspondence determination might be done based on reference pixel color values or other elements of the frames, such as tracking markers on a greenscreen that might move from frame to frame but are fixed relative to the greenscreen.

The corresponding pixels in the nearby-in-time frame might be coincident in image space with the reference pixels or might be coincident with elements in the scene as those elements move from frame to frame. The latter might be done by having the compositing operator select reference points that are near tracking markers and determining movement of those tracking markers in image space. By selecting reference points that are near tracking markers and not at tracking markers, the compositing system might generate a color gradient array that doesn't include the tracking markers, as the gradients might be smooth as they pass over the tracking marker's pixels.

FIG. 1 illustrates a frame of a captured scene of objects, a removed background, and a replaced background and a compositing process. A frame 102 is shown as an image of objects 104, 106, 108 in front of a designated replaceable background object ("green screen") 110 that in this example does not happen to have a uniform color. The green screen 110 might have included thereon fiducials 112 that can serve as tracking markers. A compositing operation is performed to identify the replaceable pixels that are pixels of the green screen, illustrated as green screen image 114 representing a green screen image 116. Another compositing operation is performed to combine the retained pixels (the blank white regions of green screen image 114) with another background image (computer-generated or otherwise). A frame 118 illustrates such as result, wherein objects 122 and 124 are part of replacement background 120 and are integrated in with the objects that were in front of the green screen.

Figure 2:
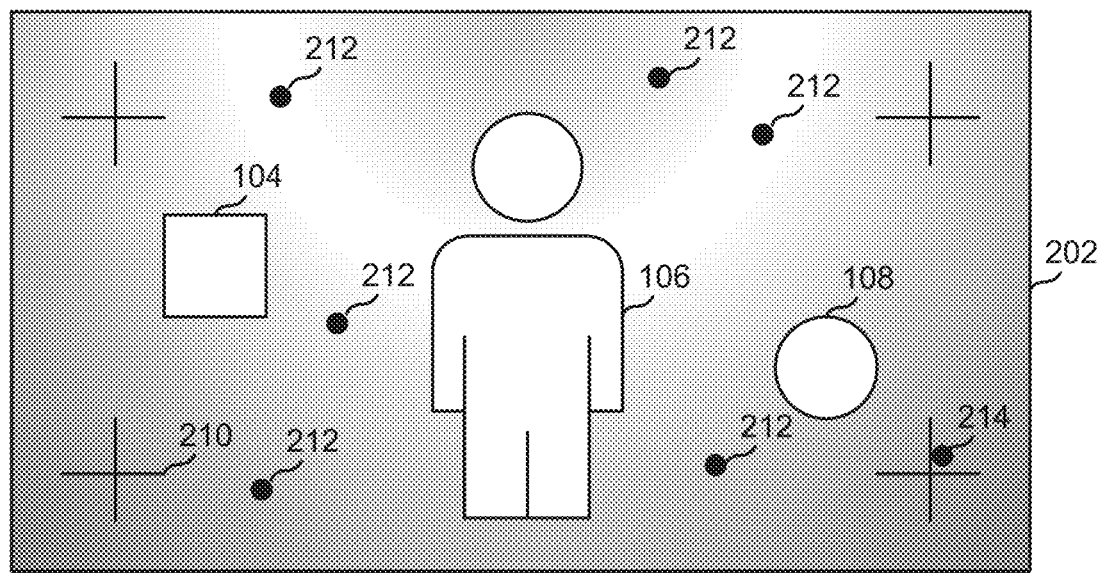
FIG. 2 illustrates a captured frame of objects, fiducials, and selected reference points, and a gradient image.
Figure 2:
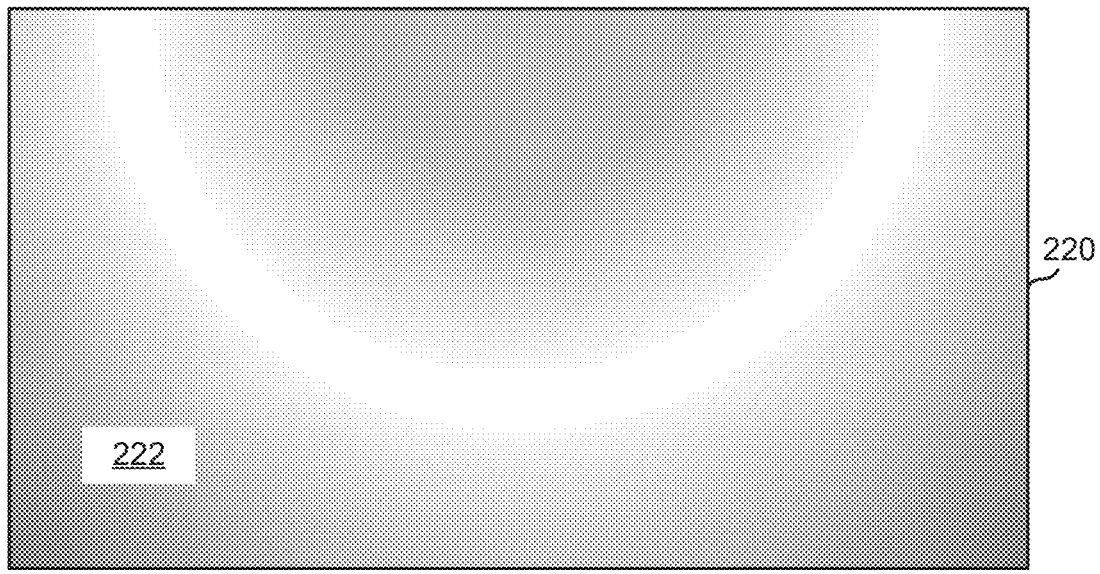

FIG. 2 illustrates a captured frame of objects, fiducials, and selected reference points, and a gradient image. A captured image 202 includes objects 104, 106, 108, as well as fiducials 210 over a background 211. The captured image 202 might be presented to a user on a display and a user interface provided for the user to select reference points in the image. In this example, various reference points 212 are displayed, corresponding to user selections. One such reference point 214 is selected near a fiducial but is not exactly on the fiducial.

As explained herein, a compositor might be programmed with program code that can compute a gradient image (or a gradient function) from selected reference points. An example gradient image 220 is shown in FIG. 2 with a gradient background 222. In this example, the gradient background 222 is not identical to background 211, but that need not be the case. As explained herein, the compositor determines the colors of the reference points and from there computes at least an approximate gradient function that would match (or closely match) color values at the reference points. From the gradient function, a gradient background could be computed and in compositing, that computed gradient background could be subtracted from the captured image. This would provide an effect of removing the replaceable pixels as they are determined from the gradient background.

In a compositing operation, a user might be presented with an image captured that included a green screen and the user would select some number pixels of the green screen, perhaps a number determined interactively as the user sees effects of their selections. From the selected reference points and the colors of the pixels at those selected reference points, the compositor could determine a smooth color gradient (and thus a gradient background image like gradient background 222) to remove from captured image 202. A display might be provided to the user illustrating effects of the removal, perhaps on the same display that displays the captured image and provides a user interface for the user to enter in additional reference points or modify selections.

The compositor might use, for each reference pixel, a pixel color value of that pixel. In other embodiments, pixel color values of pixels around the reference pixel might come into play. For example, the pixel color value that is used for a reference pixel might be a color value that is a function of pixels around that reference pixel rather than being dependent only on the color value of that reference pixel. The window and function might be user-selectable. For example, pixels in a window that is relative to the reference pixel might be part of a Gaussian blob and a corresponding function would be used to determine a weighted sum of nearby pixels to be used as the reference pixel color value. In another example, an average of pixel color values in a rectangular window around the reference pixel might be used as that reference pixel's color value for the purposes of computing the color gradient array. In other variations, a pixel color value unrelated to the reference pixel's color value might be assigned.

Figure 3:
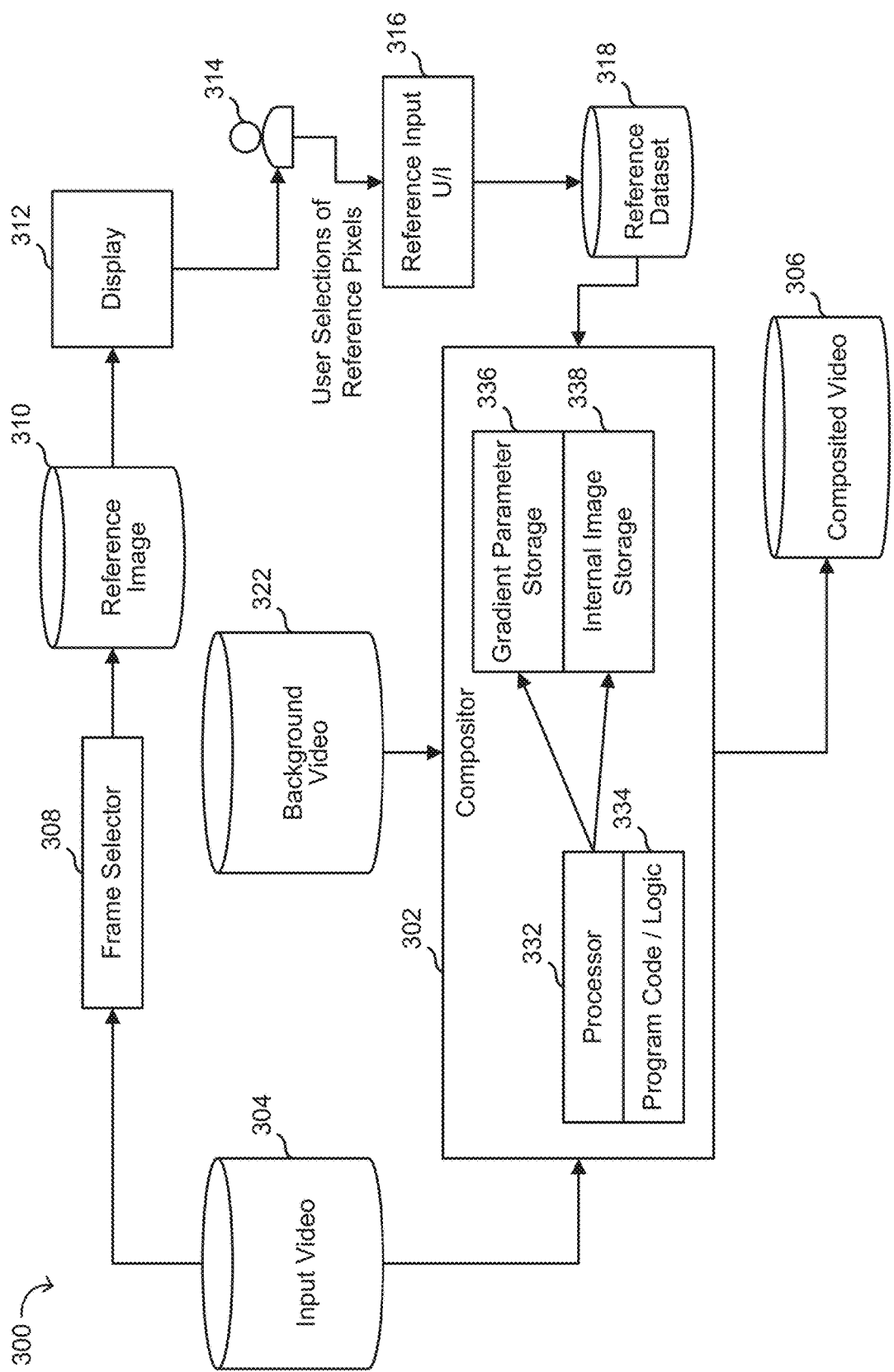
FIG. 3 is a block diagram of a system for compositing based on reference points provided for reference to a removeable background.

FIG. 3 is a block diagram of a system 300 for compositing based on reference points provided for reference to a removeable background. As illustrated there, a compositor 302 receives input video 304 and outputs composited video 306, wherein some pixels are retained pixels, replaceable pixels, or replacement pixels, or some combination thereof. As part of the replacement process, a replaceable background is determined. For that process, a frame selector 308 selects a frame of the input video 304 to form a reference image 310, which is displayed on a display 312 to a user 314. The user 314 can then specify, using a reference input user interface 316, which pixels are to be reference points of the selected frame. Those selections can be stored as a reference dataset 318, that is provided to compositor 302.

Compositor 302 is shown with an input for a background video 322 comprising replacement pixels. Compositor 302 is shown comprising a processor 332, program code/logic 334 that might implement functions, processes, etc. described herein, gradient parameter storage 336, and internal image storage 338.

In an operation, compositor 302 receives reference dataset 318 and from that determines a set of gradient parameters that define the gradient image to be used to identify and replace replaceable pixels. This can be used for cases where a green screen is not evenly illuminated, has artifacts, or has other issues. The gradient parameters might be values for radial basis functions and/or splines, or other processes for smoothly valuing points in a two-dimensional array. This can allow for less expensive green screens, less effort in green screen setup, and/or other benefits. This process can be used for keying green screens that do not have uniform color. In one embodiment, reference points have associated colors (the colors of the pixels that are reference points), and the gradient image that is used might be a uniform color that is an average of the colors of reference points. In another embodiment, the compositor generates a thin plate spline radial basis function that fits the color values of the pixels.

Figure 4:
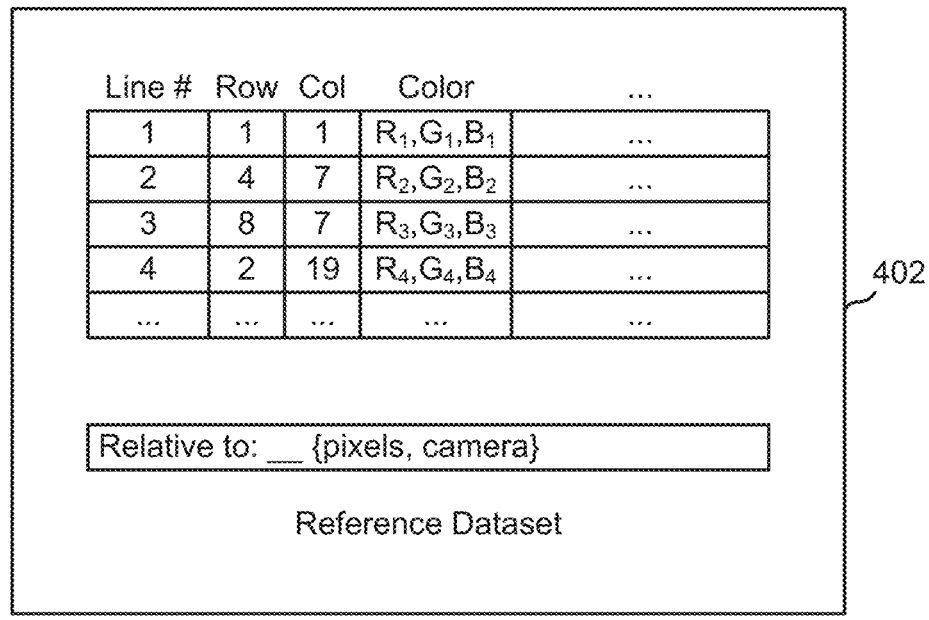
FIG. 4 illustrates a reference dataset, as might be used to describe reference points used in characterizing a removeable background.

FIG. 4 illustrates a reference dataset 402, as might be used to describe reference points used in characterizing a removeable background. In this example, a data structure for reference dataset 402 comprises lines, one per reference point, and a selector for which relative position to use. As shown, a reference point might be represented by a row and column of a pixel array, a color at that location, and possibly other information. The relative position selector might be a selection, which the user might be able to make, between the reference points being selected relative to pixel position or relative to camera position.

In some embodiments, a computer process is executed to compute locations for reference points. It could be that a user or computer process will select reference points in each input video frame, but it might be a better user interface if a computer process determines reference points for one frame based on user selections of reference points for nearby frames.

Figure 5:
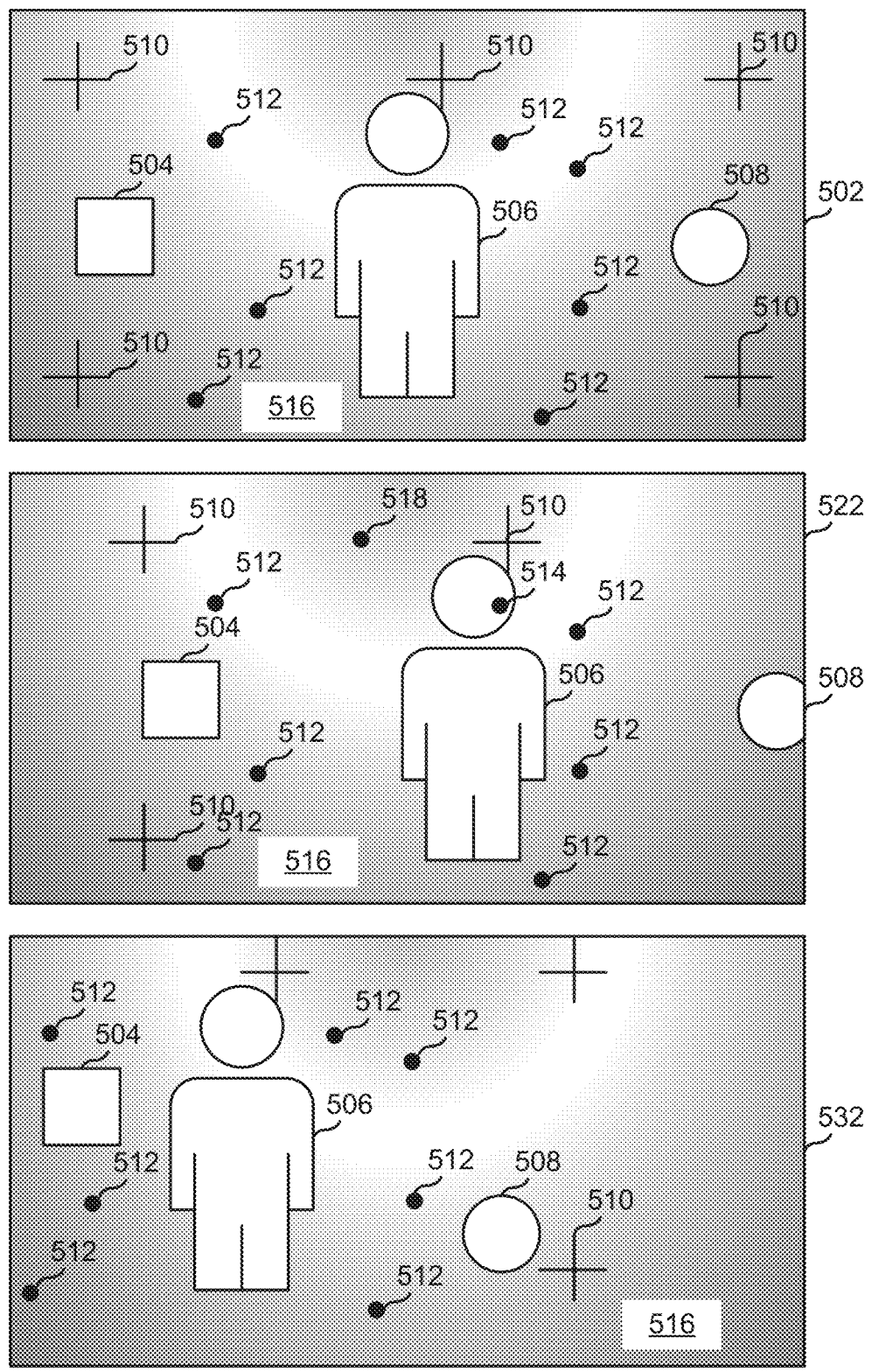
FIG. 5 illustrates different examples of how reference points are described relative to elements in a captured scene.

FIG. 5 illustrates different examples of how reference points are described relative to elements in a captured scene. In a frame A 502, a captured image shows objects 504, 506, 508, 510 in front of a background 516. Also shown are reference points 512 selected by a user. In frame B 522, objects 504, 506, 508, 510 have moved relative to background 516, but the reference points 512 are designated as being relative to the pixel array, so they maintain their relative positions relative to the frame as between frame A and frame B as other objects move in the frame. Frame C 532 shows another option, wherein the reference points are relative to the scene and move in the frame. It may be that fiducials 510 are embedded in the green screen and are used to measure a camera movement, so that while objects 504, 506, 508 all move relative to each other, a compositor can easily reference camera movement by tracking movement of the fiducials.

From just one frame of reference points, the compositor could generate a gradient image for each frame be generating reference points for additional frames based on whether they are pixel-relative, camera-relative, or relative to some other feature. In some cases, some reference points might be pixel-relative and some camera-relative, such as a case where there are pixel-relative reference points near each corner of a frame and at the center of the frame, and camera-relative reference points near some of the fiducials. In cases where reference points in subsequent frames are computationally determined from reference points in a reference image, there might be instances where a reference point is on a foreground object, such as reference point 514 on the head of the character in Frame B. These reference points can be ignored or deleted so that the colors of foreground objects are not used for computing gradient functions. Additional reference points might be added to the computed reference points, such as reference point 518 in the upper center of Frame B.

In some embodiments, the computed reference points are assigned color values from the reference frame reference points' colors. For example, a user might select a pixel in a reference frame to be a camera-relative reference point and that pixel might have a color value of $(R_x, G_x, B_x)$ in the reference frame. The compositor can then compute where the reference point would be in a subsequent or prior frame and instead of using the color of that frame at that reference point, it uses $(R_x, G_x, B_x)$. This can accommodate scenes where there are flashes of light that would create undesirable artifacts.

Figure 6:
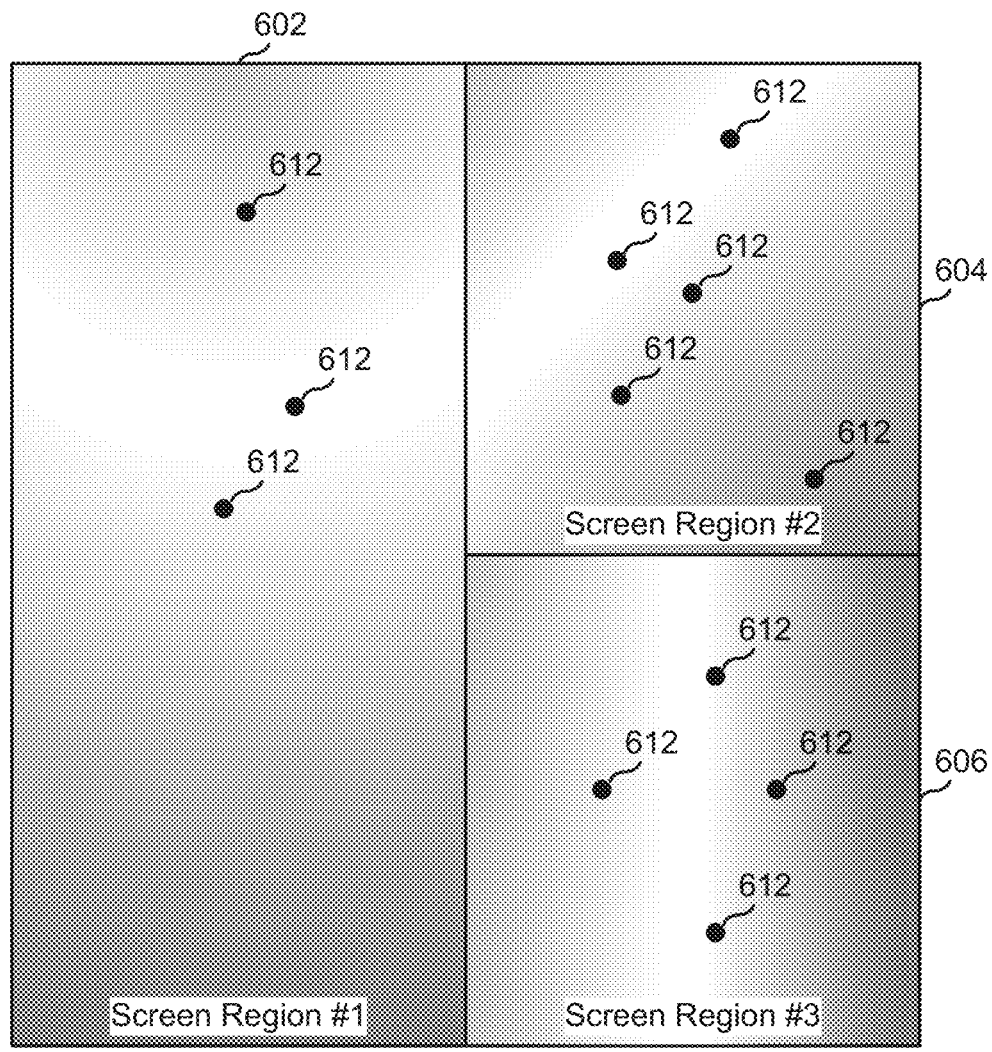
FIG. 6 illustrates an example of a captured scene where reference points are applicable to subsets of the frame.

FIG. 6 illustrates an example of a captured scene where reference points are applicable to subsets of the frame, which can be useful where there are hard changes between portions of a screen. For example, it might be the case where chroma keying was used, but the background screen comprised two screens that aren't the same color under the given lighting conditions. In FIG. 6, a reference frame is partitioned into a Screen Region #1 602, a Screen Region #2 604, and a Screen Region #3 606 and reference points 612 are selected. Using the partitioning, a compositor would use the reference points in each screen region to form a gradient image that is used for that screen region. This can be useful where the gradients and/or coloration from region to region is not consistent. As illustrated in FIG. 6, Screen Region #1 has somewhat of a circular gradient, Screen Region #2 has somewhat of a diagonal gradient, and Screen Region #3 has somewhat of a horizontal gradient, the latter of which might be easily modeled by the four reference points shown.

FIGS. 7-10 illustrate one example of using a gradient image.

Figure 7:
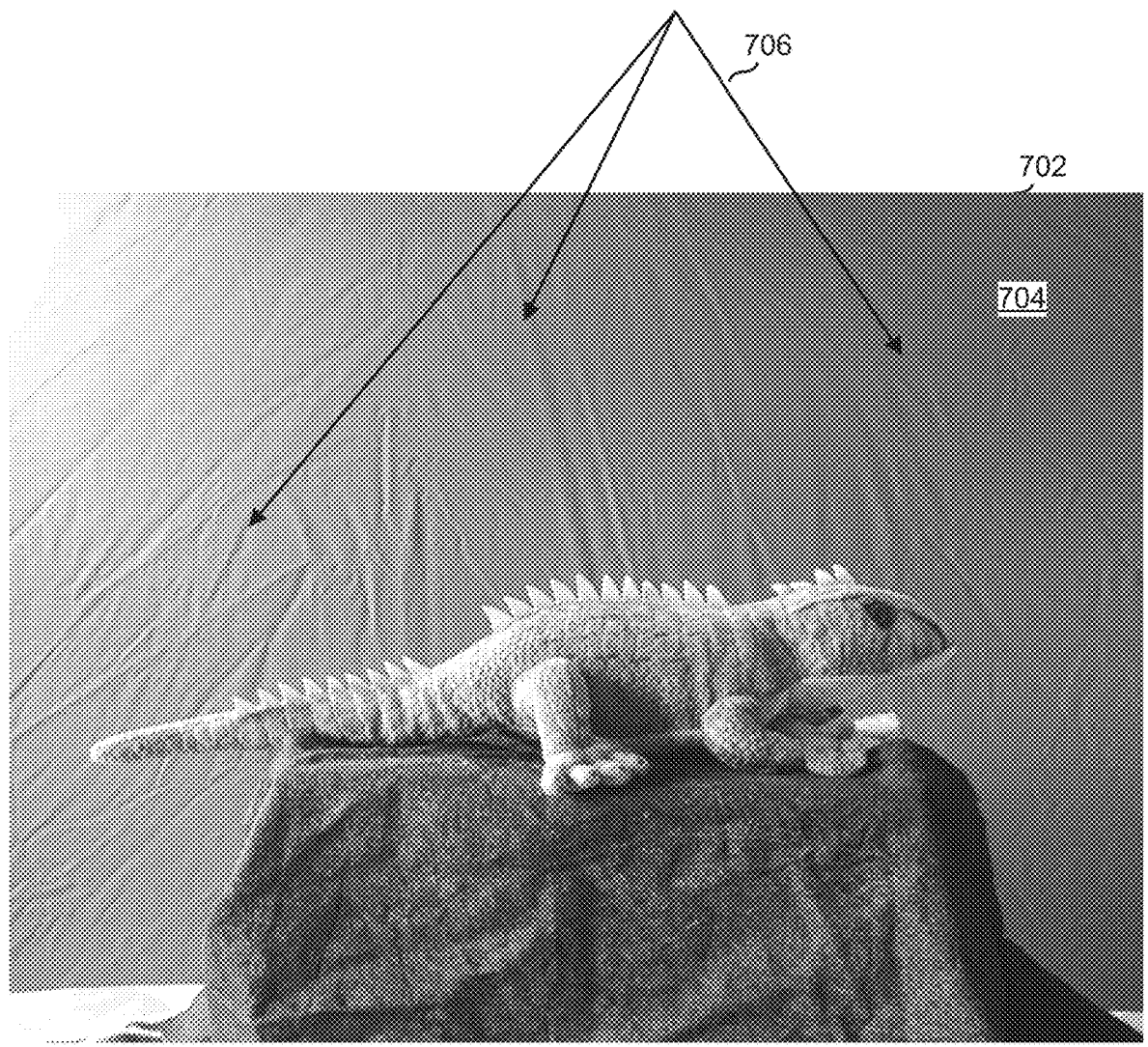
FIG. 7 illustrates an example of an image captured having a low-quality chroma keying screen.
Figure 8:
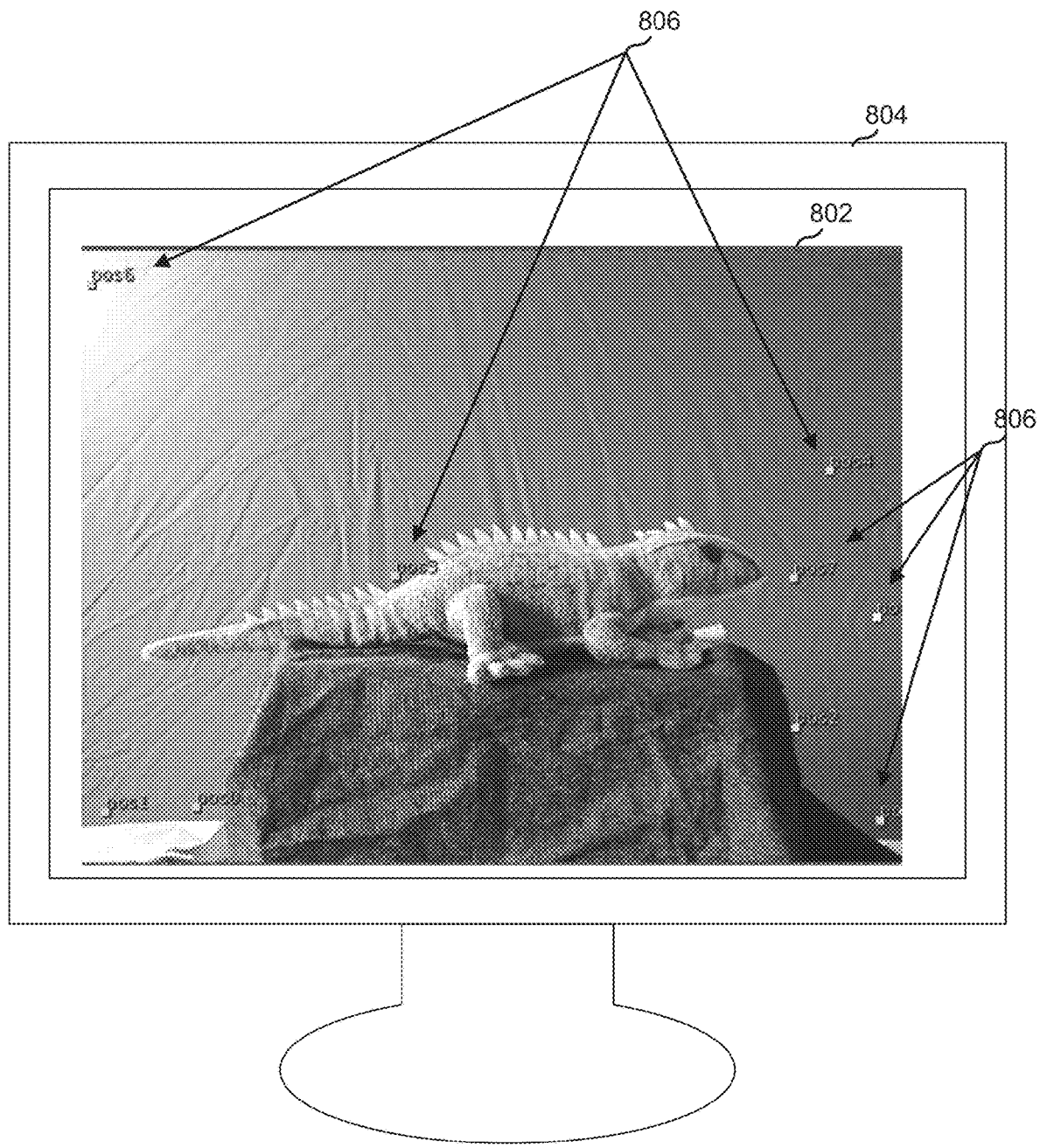
FIG. 8 illustrates an example of a computer display of the image of FIG. 7 wherein a user can select reference points for a multigradient process.
Figure 9:
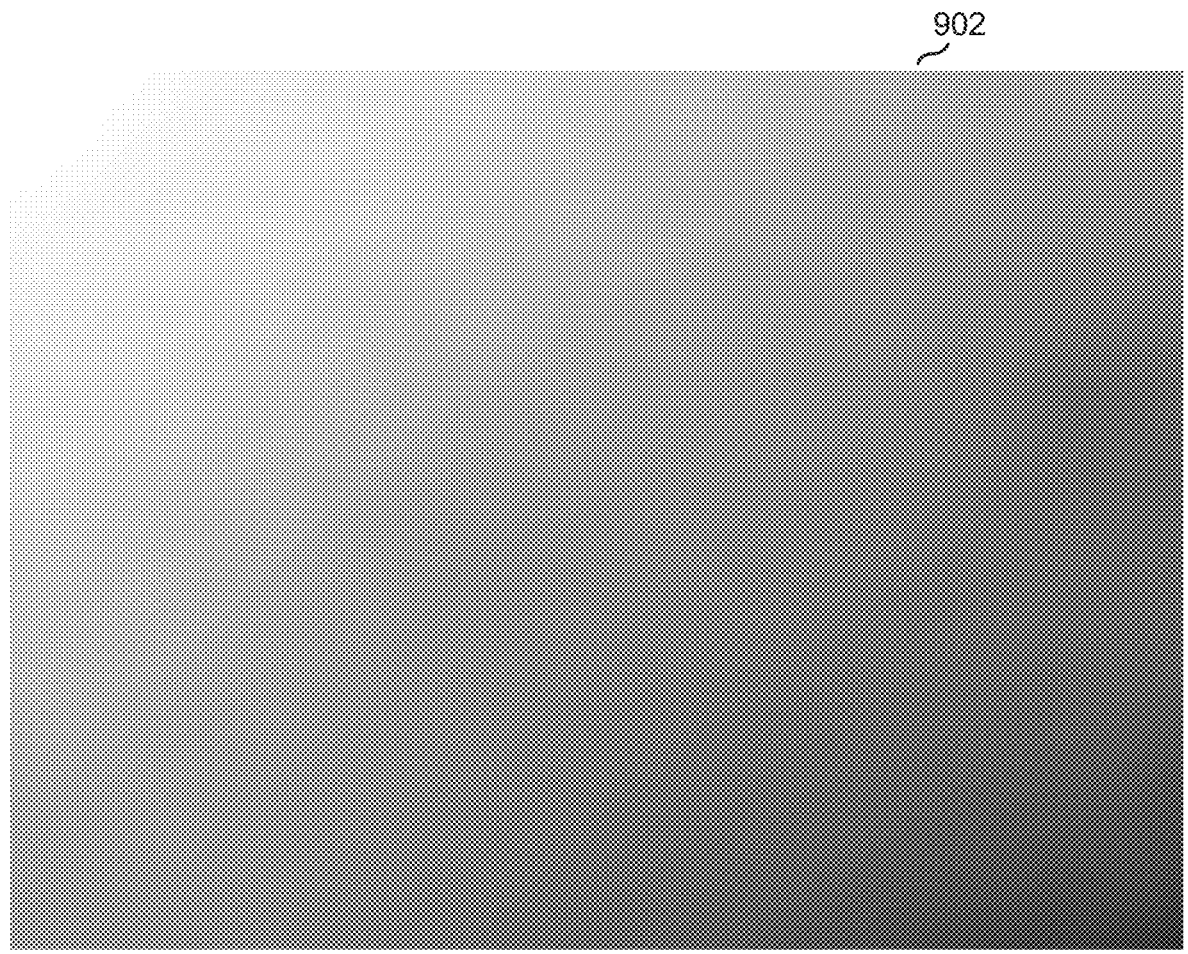
FIG. 9 illustrates a gradient image that might be generated based on the image of FIG. 7 and the reference points selected as in FIG. 8.

FIG. 7 illustrates an example of an image 702 captured having a low-quality chroma keying screen. It should be noted that, for patent filing purposes and other reasons, FIGS. 7-9 are presented in grayscale but it can be readily understood that for chroma keying, a background 704 in FIG. 7 might be a particular shade of some color other than gray. Due to the quality of background 704, there are artifacts 706 that are not intended to be part of the scene of image 702, but are preferably removed programmatically.

FIG. 8 illustrates an example of a computer display 804 displaying image 802 (similar to image 702 in FIG. 7) wherein a user can select reference points for a multigradient process. As illustrated there, reference points 806 are selected. From these reference points 806 and the image pixel color at those reference points 806, a compositing system can compute an interpolation from those reference points 806 wherein the interpolation can be represented in computer-readable form as a color gradient array representing gradient color values for pixels over an image array based on reference pixel color values and reference pixel locations wherein the gradient color values correspond to interpolated values over the color gradient array and align with the reference pixel color values at their respective reference pixel locations.

FIG. 9 illustrates a gradient image 902 that might be generated based on image 702 of FIG. 7 and reference points 806 selected as in FIG. 8. Gradient image 902 might be stored as the above-mentioned color gradient array. In some embodiments, a color gradient array can be stored as a pixel array. In other embodiments, the color gradient array might be represented by a set of parameters, from which the pixel array could be easily computed.

Figure 10:
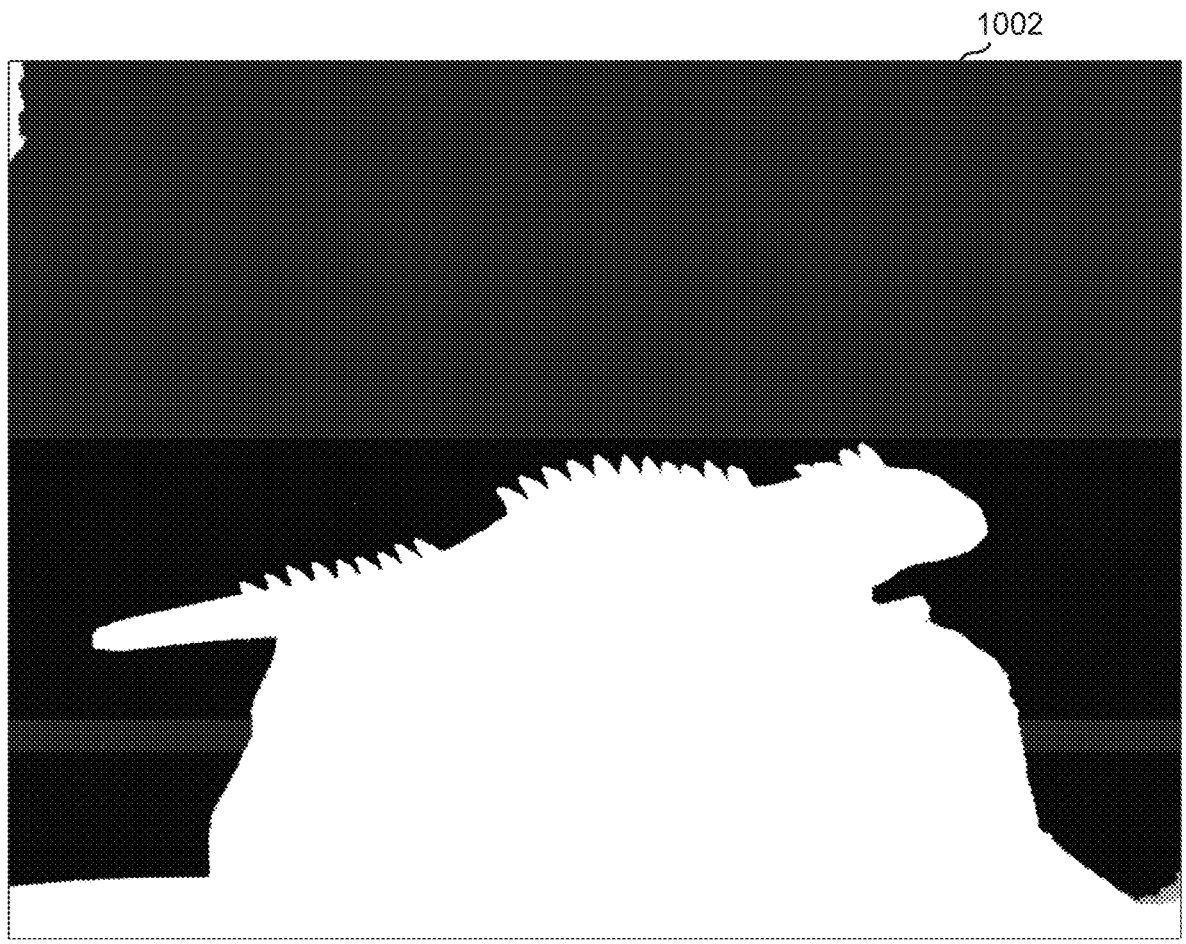
FIG. 10 is an example illustration of what might be a matte image.

FIG. 10 is an example illustration of what might be a matte image 1002. In matte image 1002, black pixels represent pixels designated as belonging to the quality chroma keying screen and white pixels representing pixels belonging to image elements that are to remain for use or further compositing.

In various embodiments, a compositing system can be used for compositing a captured scene or a CGI scene based on compositing operator input or other inputs. An image of the captured scene or CGI scene might comprise foreground elements and a background element to be replaced with corresponding pixels/subpixels of a background image, thus forming a composited image. The background element could be a chroma keying screen of uniform color, but that is not required. In various embodiments, compositing might comprise a process of combining two images into a composited image, such as in a programmatic fashion. A captured scene might be a physical scene at a live stage (a physical studio stage, outdoors, or elsewhere where a scene physically exists) using a camera or image capture device or devices. It is possible that the captured scene is a live action scene, a CGI scene, or some combination. An entirely computer-generated image of a virtual scene might not need compositing to replace a background element with pixels from a background image, but there might be situations where editing a scene description and re-rendering the image is not possible or practical and thus some compositing might be needed. In the general case, a source of a captured image might not be particularly relevant, so long as it can be processed as a digital representation of an image taken, or generated, of a scene.

The scene might include one or more foreground element that is an object, visual effect, etc. present in the captured image that is to be included in the composited image, as well as including a background element (or more than one) of the captured image to be replaced by corresponding pixels of a background image. In a simple example, the foreground element is an actor, the background element is part of a stage that is to be eliminated in a final composited image, and the background image is scenery such that when composited, it appears that the actor is present in front of the depicted scenery despite having been filmed in front of the background element. The images could be single images or frames of video that have a time relationship among themselves.

A compositing system can provide a compositing operator a display of a captured image. The compositing system might have a user interface with which the compositing operator can select a set of reference pixels relative to the captured image, which might allow for an arbitrary number of reference pixels. The selection might be generated by some programmatic process instead, of a combination of manual and programmatic selection.

Where each reference pixel has a location in an image array of the captured image, for each reference pixel, a reference pixel color value can be determined from the captured image, or possibly specified in some other way. For example, a compositing operator might specify a particular pixel to be a reference pixel and also specify a reference pixel color value that is different from the color value of that pixel in the captured image. This might be for artistic reasons. In one specific example, the compositing operator might see that there is a desired color gradient to capture but that a desired reference pixel's position is on a foreground object. The compositing operator could nonetheless specify that the pixel is a reference pixel and assign it a pixel color that results in a desired color gradient over the image that matches, at least approximately, the color value specified despite it not being the pixel's actual color value.

From the set of reference pixels, their locations and their reference pixel color value, the compositing system can compute a color gradient array, which would include interpolated color values for pixels other than the reference pixels. If a set of reference pixels is selected that all coincidentally have the same pixel color value, the color gradient array might comprise a set of pixel color values that are the same, whereas where the pixel color values of the reference pixels vary, the color gradient array might have varying values that might correspond to interpolated values interpolated from pixel color values at the reference pixels.

The color gradient array can represent gradient color values for pixels over the image array based on reference pixel color values and the reference pixel locations. The gradient color values can vary over the color gradient array. At the reference pixel locations, pixel color values of the color gradient array might equal those pixels' reference pixel color values, at least approximately.

A compositing operator might select representative pixels on an image that are pixels showing a greenscreen or other chroma keying reference object (more generally, a background element), and have the compositing system generate a smooth color gradient array that could be deemed to correspond to the color, possibly varying over the captured image, of the background element. Knowing that color gradient array, the compositing system could determine what other pixels are likely depicting the background element and use that information for replacing the background element with pixels from the background element.

Interpolating color values for pixels other than reference pixels might comprise computing a radial basis function from the reference color values and the reference pixel locations and setting gradient color values for interpolation pixels other than the reference pixels of the set of reference pixels according to the radial basis function. The radial basis function might be a thin-plate spline radial basis function.

In addition to determining interpolated color gradient array pixel color values for pixels other than reference pixels, the compositing system can compute what proportion of a pixel of the captured image is contributed by the background object and what proportion of that pixel is contributed by a foreground element and thus could compute an alpha channel image usable for various purposes.

The color gradient array might be computed from one captured image and a set of reference pixels, but used for other frames where the captured image is one frame of a video sequence. For example, the compositing operator might select reference pixels in a first frame and the compositing system could compute where corresponding pixels are in a nearby-in-time frame that correspond to those reference pixels and then compute a color gradient array for that nearby-in-time frame. The frame-to-frame correspondence determination might be done based on reference pixel color values or other elements of the frames, such as tracking markers on a greenscreen that might move from frame to frame but are fixed relative to the greenscreen.

The corresponding pixels in the nearby-in-time frame might be coincident in image space with the reference pixels or might be coincident with elements in the scene as those elements move from frame to frame. The latter might be done by having the compositing operator select reference points that are near tracking markers and determining movement of those tracking markers in image space. By selecting reference points that are near tracking markers and not at tracking markers, the compositing system might generate a color gradient array that doesn't include the tracking markers, as the gradients might be smooth as they pass over the tracking marker's pixels.

The visual content generation system 1100 (see FIG. 11) can be used for the compositing processes described herein.

Figure 11:
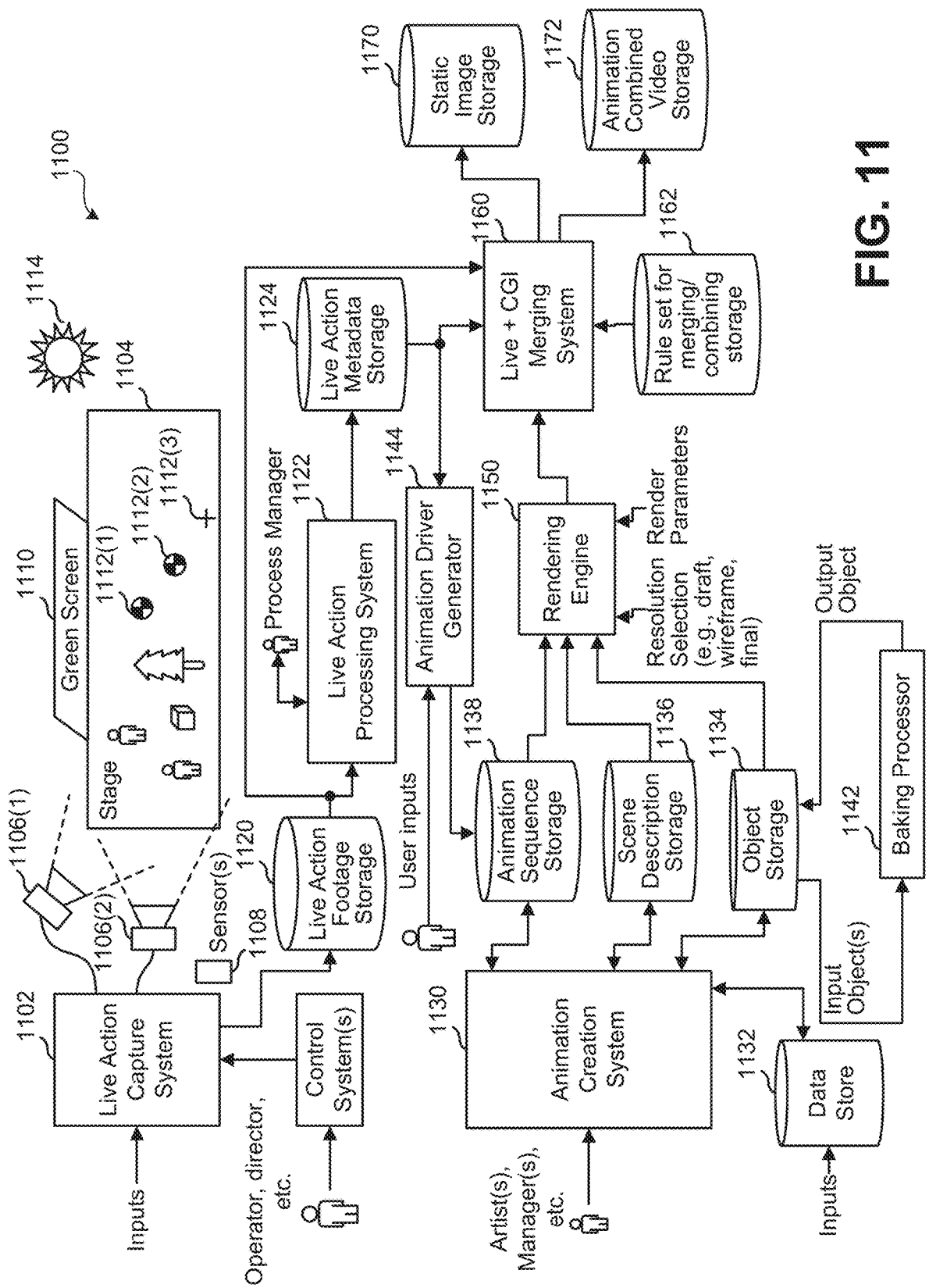
FIG. 11 illustrates an example visual content generation system as might be used to generate imagery in the form of still images and/or video sequences of images, according to various embodiments.

For example, FIG. 11 illustrates the example visual content generation system 1100 as might be used to generate imagery in the form of still images and/or video sequences of images. Visual content generation system 1100 might generate imagery of live action scenes, computer generated scenes, or a combination thereof. In a practical system, users are provided with tools that allow them to specify, at high levels and low levels where necessary, what is to go into that imagery. For example, a user might be an image or animation artist and might use visual content generation system 1100 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1100 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 11, a live action capture system 1102 captures a live scene that plays out on a stage 1104. Live action capture system 1102 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1106(1) and 1106(2) capture the scene, while in some systems, there might be other sensor(s) 1108 that capture information from the live scene (e.g., infrared cameras, infrared sensors, motion capture ("mo-cap") detectors, etc.). On stage 1104, there might be human actors, animal actors, inanimate objects, background objects, and possibly an object such as a green screen 1110 that is designed to be captured in a live scene recording in such a way that it is easily overlaid with computer-generated imagery. Stage 1104 might also contain objects that serve as fiducials, such as fiducials 1112(1)-(3), that might be used post-capture to determine where an object was during capture. A live action scene might be illuminated by one or more lights, such as an overhead light 1114.

During or following the capture of a live action scene, live action capture system 1102 might output live action footage to a live action footage storage 1120. A live action processing system 1122 might process live action footage to generate data about that live action footage and store that data into a live action metadata storage 1124. Live action processing system 1122 might include computer processing capabilities, image processing capabilities, one or more processors, program code storage for storing program instructions executable by the one or more processors, as well as user input devices and user output devices, not all of which are shown. Live action processing system 1122 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1114, as that might be useful in post-processing to match computer-generated lighting on objects that are computer-generated and overlaid on the live action footage. Live action processing system 1122 might operate autonomously, perhaps based on predetermined program instructions, to generate and output the live action metadata upon receiving and inputting the live action footage. The live action footage can be camera-captured data as well as data from other sensors.

An animation creation system 1130 is another part of visual content generation system 1100. Animation creation system 1130 might include computer processing capabilities, image processing capabilities, one or more processors, program code storage for storing program instructions executable by the one or more processors, as well as user input devices and user output devices, not all of which are shown. Animation creation system 1130 might be used by animation artists, managers, and others to specify details, perhaps programmatically and/or interactively, of imagery to be generated. From user input and data from a database or other data source, indicated as a data store 1132, animation creation system 1130 might generate and output data representing objects (e.g., a horse, a human, a ball, a teapot, a cloud, a light source, a texture, etc.) to an object storage 1134, generate and output data representing a scene into a scene description storage 1136, and/or generate and output data representing animation sequences to an animation sequence storage 1138.

Scene data might indicate locations of objects and other visual elements, values of their parameters, lighting, camera location, camera view plane, and other details that a rendering engine 1150 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1130 might be interactive, allowing a user to read in animation sequences, scene descriptions, object details, etc. and edit those, possibly returning them to storage to update or replace existing data. As an example, an operator might read in objects from object storage into a baking processor 1142 that would transform those objects into simpler forms and return those to object storage 1134 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1132 might be used to drive object presentation. For example, if an artist is creating an animation of a spaceship passing over the surface of the Earth, instead of manually drawing or specifying a coastline, the artist might specify that animation creation system 1130 is to read data from data store 1132 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1144 might read in live action metadata, such as data representing movements and positions of body parts of a live actor during a live action scene. Animation driver generator 1144 might generate corresponding animation parameters to be stored in animation sequence storage 1138 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1122. Animation driver generator 1144 might convert that movement data into specifications of how joints of an articulated CGI character are to move over time.

A rendering engine 1150 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1150 might include computer processing capabilities, image processing capabilities, one or more processors, program code storage for storing program instructions executable by the one or more processors, as well as user input devices and user output devices, not all of which are shown.

Visual content generation system 1100 can also include a merging system 1160 that merges live footage with animated content. The live footage might be obtained and input by reading from live action footage storage 1120 to obtain live action footage, by reading from live action metadata storage 1124 to obtain details such as presumed segmentation in captured images segmenting objects in a live action scene from their background (perhaps aided by the fact that green screen 1110 was part of the live action scene), and by obtaining CGI imagery from rendering engine 1150.

A merging system 1160 might also read data from rulesets for merging/combining storage 1162. A very simple example of a rule in a ruleset might be "obtain a full image including a two-dimensional pixel array from live footage, obtain a full image including a two-dimensional pixel array from rendering engine 1150, and output an image where each pixel is a corresponding pixel from rendering engine 1150 when the corresponding pixel in the live footage is a specific color of green, otherwise output a pixel value from the corresponding pixel in the live footage."

Merging system 1160 might include computer processing capabilities, image processing capabilities, one or more processors, program code storage for storing program instructions executable by the one or more processors, as well as user input devices and user output devices, not all of which are shown. Merging system 1160 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1160, such as modifying boundaries of segmented objects, inserting blurs to smooth out imperfections, or adding other effects. Based on its inputs, merging system 1160 can output an image to be stored in a static image storage 1170 and/or a sequence of images in the form of video to be stored in an animated/combined video storage 1172.

Thus, as described, visual content generation system 1100 can be used to generate video that combines live action with computer-generated animation using various components and tools, some of which are described in more detail herein. While visual content generation system 1100 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data that includes image data having shadow details generated using the methods described herein. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 12:
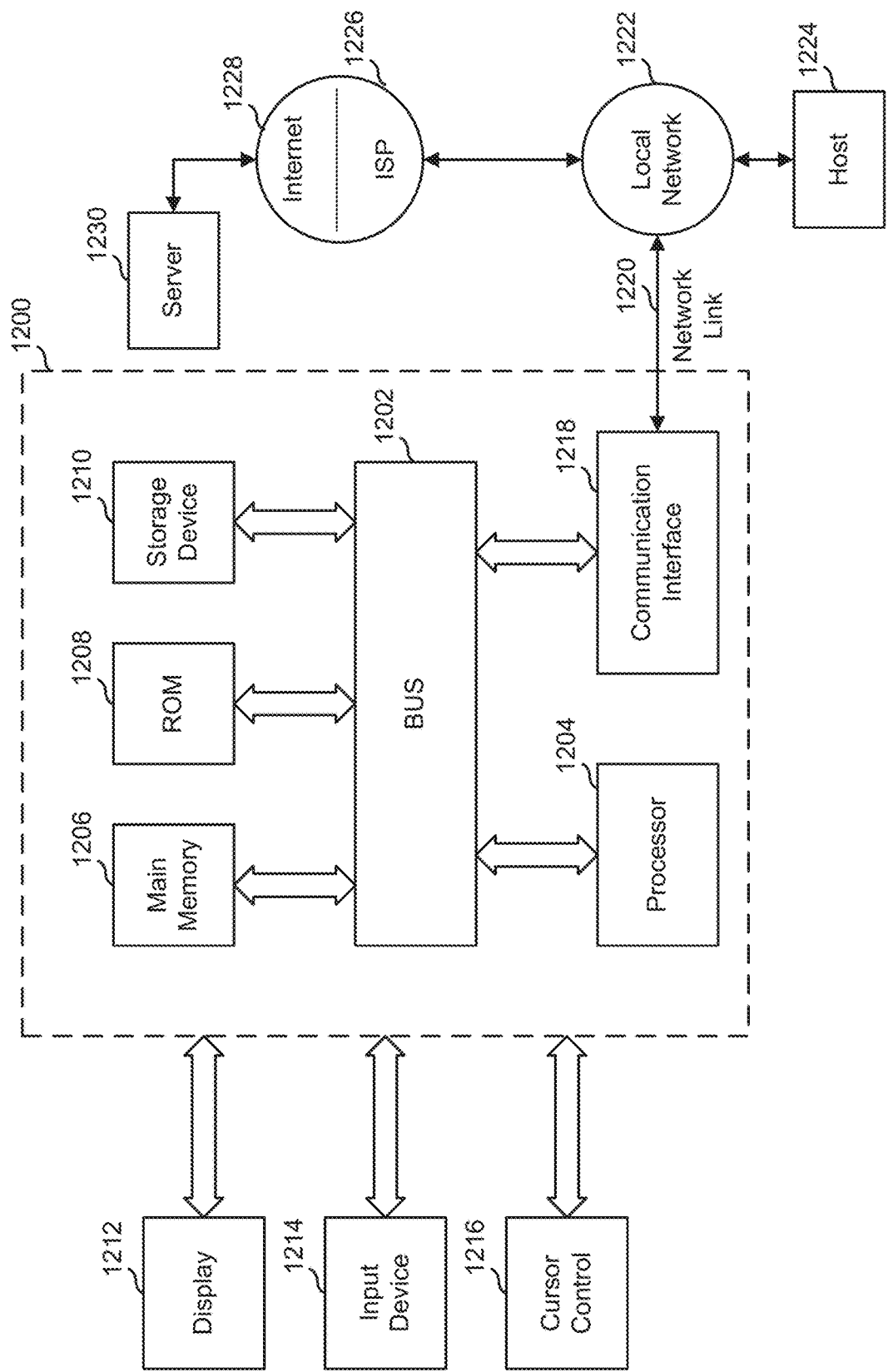
FIG. 12 is a block diagram illustrating an example computer system upon which computer systems of the systems illustrated in FIGS. 1 and 11 may be implemented.

For example, FIG. 12 is a block diagram that illustrates a computer system 1200 upon which the computer systems of the systems described herein and/or visual content generation system 1100 (see FIG. 11) may be implemented. Computer system 1200 includes a bus 1202 or other communication mechanism for communicating information, and a processor 1204 coupled with bus 1202 for processing information. Processor 1204 may be, for example, a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 may also be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a computer monitor, for displaying information to a computer user. An input device 1214, including alphanumeric and other keys, is coupled to bus 1202 for communicating information and command selections to processor 1204. Another type of user input device is a cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a network connection. A modem or network interface local to computer system 1200 can receive the data. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be a network card, a modem, a cable modem, or a satellite modem to provide a data communication connection to a corresponding type of telephone line or communications line. Wireless links may also be implemented. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world-wide packet data communication network now commonly referred to as the "Internet" 1228. Local network 1222 and Internet 1228 both use electrical, electromagnetic, or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220, and communication interface 1218. In the Internet example, a server 1230 might transmit a requested code for an application program through the Internet 1228, ISP 1226, local network 1222, and communication interface 1218. The received code may be executed by processor 1204 as it is received, and/or stored in storage device 1210, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating multigradient image components in an image processing system, the method comprising:
    under control of one or more computer systems configured with executable instructions:
    obtaining a first indication of a set of reference pixels, each having a pixel location in an image array of a first image;
    obtaining a second indication comprising reference pixel color values associated with each reference pixel of the set of reference pixels;
    computing a color gradient array from the reference pixel color values and reference pixel locations, wherein the color gradient array represents gradient color values for pixels over the image array based on reference pixel color values and the reference pixel locations wherein the gradient color values correspond to interpolated values over the color gradient array and align with the reference pixel color values at their respective reference pixel locations; and
    processing the first image using the color gradient array.

2. The computer-implemented method of claim 1, wherein alignment of the interpolated values with the reference pixel color values is approximate and within a predetermined error margin.

3. The computer-implemented method of claim 1, further comprising:
    obtaining at least one image, including the first image, of live action using an image capture device or system;
    generating a displayable representation of the first image, wherein the set of reference pixels comprises first image pixels of the first image; and
    determining the reference pixel color values and the reference pixel locations for each reference pixel of the set of reference pixels,
    wherein processing the image comprises processing a second image using the color gradient array.

4. The computer-implemented method of claim 3, further comprising:
    presenting the displayable representation to a user on an image display device; and
    accepting inputs from the user selecting the set of reference pixels on the image display device.

5. The computer-implemented method of claim 1, wherein the set of reference pixels are pixels selected to correspond with pixels representing a background element of a scene that is to be replaced with corresponding pixels or subpixels of a background image.

6. The computer-implemented method of claim 1, wherein computing the color gradient array comprises interpolating color values at interpolation locations other than the reference pixel locations.

7. The computer-implemented method of claim 6, wherein interpolating color values comprises computing a radial basis function from the reference pixel color values and the reference pixel locations and setting gradient color values for interpolation pixels other than the reference pixels of the set of reference pixels according to the radial basis function.

8. The computer-implemented method of claim 7, wherein the radial basis function is a thin-plate spline radial basis function.

9. The computer-implemented method of claim 1, wherein a specific reference pixel color value associated with a specific reference pixel is a function of multiple pixels of a captured image.

10. The computer-implemented method of claim 9, wherein the multiple pixels are pixels in a window of the captured image relative to the specific reference pixel and the function comprises a Gaussian blob function of pixels in the window.

11. The computer-implemented method of claim 9, wherein the multiple pixels are pixels in a window of the captured image relative to the specific reference pixel and the function comprises a uniform weighting of the pixels in the window and the window is a rectangular pixel array.

12. The computer-implemented method of claim 1, wherein computing the color gradient array comprises:
   determining a first proportion for an interpolation pixel at an interpolation location other than one of the reference pixel locations, wherein the first proportion represents a proportion of a foreground contribution to a color of the interpolation pixel and a background contribution to the color of the interpolation pixel; and
   representing an interpolating color value at the interpolation location based, in part, on the first proportion.

13. The computer-implemented method of claim 12, further comprising representing the first proportion for an interpolation pixel and first proportions for other interpolation pixels in an alpha channel.

14. The computer-implemented method of claim 1, further comprising:
   processing the first image using the color gradient array to determine background pixels, foreground pixels, and mixed foreground-background pixels;
   subtracting a first set of color gradient array pixel color values from the background pixels;
   partially subtracting a second set of color gradient array pixel color values from the mixed foreground-background pixels; and
   merging a resulting image with a replacement background image.

15. The computer-implemented method of claim 14, further comprising determining a first proportion for an interpolation pixel at an interpolation location other than one of the reference pixel locations, wherein the first proportion represents a proportion of a foreground contribution to a color of the interpolation pixel and a background contribution to the color of the interpolation pixel, wherein partially subtracting comprises subtracting based, in part, on the first proportion.

16. The computer-implemented method of claim 1, further comprising:
   merging the color gradient array with a second image to form a third image, wherein color in the color gradient array contributes to pixel colors in the third image.

17. The computer-implemented method of claim 1, further comprising:
   obtaining a third image, the third image representing a live action scene;
   determining a time relationship between the first image and the third image;
   determining a set of correspondence pixels in the third image that correspond to the reference pixels of the set of reference pixels of the first image;
   determining a second set of reference color values and a second set of pixel locations for correspondence pixels in the set of reference pixels;
   computing a second color gradient array, for the third image, from the second set of reference color values and the second set of pixel locations of the first image, wherein the second color gradient array represents gradient color values for pixels over the image array based on the third image; and
   processing the third image into a fourth image using the second color gradient array.

18. The computer-implemented method of claim 17, wherein determining the set of correspondence pixels in the third image that correspond to the reference pixels of the set of reference pixels of the first image comprises matching pixels of the third image with pixels in the first image based on respective pixel color values.

19. The computer-implemented method of claim 17, further comprising:
   determining movement of scene elements in the third image relative to the first image; and
   selecting the correspondence pixels in the third image based on pixel positions of the reference pixels of the first image and determined movement of the scene elements, to at least approximately align the correspondence pixels with objects in a scene.

20. The computer-implemented method of claim 19, wherein determining the movement of the scene elements in the third image relative to the first image comprises:
   identifying a first set of tracking markers in the first image;
   selecting the reference pixels relative to the first set of tracking markers;
   identifying a second set of tracking markers in the third image, the second set of tracking markers corresponding to the first set of tracking markers; and
   selecting the correspondence pixels in the third image based on the second set of tracking markers and relative positions of the reference pixels relative to the first set of tracking markers.

21. A non-transitory computer-readable storage medium storing instructions, which when executed by at least one processor of a computer system, causes the computer system to carry out the method of claim 1.

22. A computer-readable medium carrying instructions, which when executed by at least one processor of a computer system, causes the computer system to carry out the method of claim 1.

23. A computer system comprising:
   one or more processors; and
   a storage medium storing instructions, which when executed by the one or more processors, cause the computer system to implement the method of claim 1.

24. A non-transitory carrier medium carrying image data that includes a composited image and/or a gradient image generated according to the method of claim 1.

* * * * *